United States Patent
Moon et al.

(10) Patent No.: US 12,512,469 B2
(45) Date of Patent: Dec. 30, 2025

(54) POSITIVE ELECTRODE, LITHIUM BATTERY INCLUDING POSITIVE ELECTRODE, AND METHOD OF MANUFACTURING POSITIVE ELECTRODE

(71) Applicant: Samsung SDI Co., Ltd., Yongin-si (KR)

(72) Inventors: Jongseok Moon, Yongin-si (KR); Inhyuk Son, Yongin-si (KR); Andrei Kapylou, Yongin-si (KR); Guesung Kim, Yongin-si (KR); Sangkook Mah, Yongin-si (KR); Sungnim Jo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 747 days.

(21) Appl. No.: 17/649,110

(22) Filed: Jan. 27, 2022

(65) Prior Publication Data
US 2022/0246926 A1    Aug. 4, 2022

(30) Foreign Application Priority Data
Feb. 1, 2021    (KR) .................. 10-2021-0014324

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/0404* (2013.01); *H01M 4/043* (2013.01);
(Continued)

(58) Field of Classification Search
CPC .... H01M 4/525; H01M 4/0404; H01M 4/043; H01M 4/0471; H01M 4/366;
(Continued)

(56) References Cited

U.S. PATENT DOCUMENTS 9,577,256 B2 *   2/2017   Kageura ............... H01M 4/623
10,297,816 B2 *  5/2019   Hong .................... H01M 4/366
(Continued)

FOREIGN PATENT DOCUMENTS

CN    106299371 B    2/2019
CN    109830654 A    5/2019
(Continued)

OTHER PUBLICATIONS

Son, In Hyuk et al.; "Graphene balls for lithium rechargeable batteries with fast charging and high volumetric energy densities"; Nature Communications; 8; 1561; Nov. 16, 2017; 11pp.
(Continued)

*Primary Examiner* — Barbara L Gilliam
*Assistant Examiner* — Lawrence L A Raia, III
(74) *Attorney, Agent, or Firm* — Womble Bond Dickinson (US) LLP

(57) ABSTRACT

A positive electrode, a lithium battery including the positive electrode, and a method of manufacturing the positive electrode are disclosed. The positive electrode includes: a composite positive active material and a binder. The composite positive active material includes: a core including a lithium transition metal oxide; and a shell on and conformed to a surface of the core. The shell includes: at least one first metal oxide represented by Formula $M_aO_b$; and a carbonaceous material. The at least one first metal oxide may be in a carbonaceous material matrix, and M is at least one metal selected from Groups 2 to 13 and 15 and 16. The positive active material layer includes a carbonaceous conductive agent, and the carbonaceous conductive agent is present only in the shell.

16 Claims, 3 Drawing Sheets

(51) Int. Cl.
    *H01M 4/04*         (2006.01)
    *H01M 4/131*       (2010.01)
    *H01M 4/1391*     (2010.01)
    *H01M 4/36*        (2006.01)
    *H01M 4/505*       (2010.01)
    *H01M 4/62*        (2006.01)
    *H01M 10/052*     (2010.01)
    *H01M 10/0525*    (2010.01)

(52) U.S. Cl.
    CPC ......... *H01M 4/0471* (2013.01); *H01M 4/131* (2013.01); *H01M 4/366* (2013.01); *H01M 4/505* (2013.01); *H01M 4/62* (2013.01); *H01M 4/625* (2013.01); *H01M 10/052* (2013.01); *H01M 10/0525* (2013.01); *H01M 2004/028* (2013.01); *H01M 4/1391* (2013.01); *Y02E 60/10* (2013.01)

(58) Field of Classification Search
    CPC ........ H01M 4/505; H01M 4/62; H01M 4/625; H01M 10/0525; H01M 4/1391; H01M 2004/028; Y02E 60/10
    See application file for complete search history.

(56) References Cited

U.S. PATENT DOCUMENTS

| | | |
|---|---|---|
| 10,566,661 B2 | 2/2020 | Shimanuki et al. |
| 2015/0037680 A1 | 2/2015 | Park et al. |
| 2015/0380728 A1 | 12/2015 | Son et al. |
| 2016/0036049 A1* | 2/2016 | Wang .................... H01M 4/505 429/231.6 |
| 2020/0161634 A1 | 5/2020 | Kim et al. |

FOREIGN PATENT DOCUMENTS

| | | |
|---|---|---|
| JP | 2002-117832 A | 4/2002 |
| JP | 2005-093158 A | 4/2005 |
| JP | 2015-170476 A | 9/2015 |
| KR | 10-2013-0116809 A | 10/2013 |
| KR | 10-2015-0017012 A | 2/2015 |
| KR | 10-2015-0060467 A | 6/2015 |
| KR | 10-2015-0141473 A | 12/2015 |
| KR | 10-2016-0093854 A | 8/2016 |
| KR | 10-2020-0058644 A | 5/2020 |

OTHER PUBLICATIONS

Office action issued Feb. 3, 2024 in corresponding CN Patent Application No. 202210105474.7, 16pp. including translation.
Office action dated Jun. 27, 2024 issued in KR Patent Application No. 10-2021-0014324, 11pp.
European Search Report for EP Application No. 22154635.1 dated Aug. 19, 2022, 12 pages.
Hu, et al. "Titanium Monoxide-Stabilized Silicon Nanoparticles with a Litchi-like Structure as an Advanced Anode for Li-ion Batteries," ACS Appl. Mater. Interfaces, 2020, vol. 12, pp. 48467-48475.
Korean Notice of Allowance for KP Application No. 10-2021-0014324, dated Jul. 15, 2025, 3 pages.

* cited by examiner

POSITIVE ELECTRODE, LITHIUM BATTERY INCLUDING POSITIVE ELECTRODE, AND METHOD OF MANUFACTURING POSITIVE ELECTRODE

CROSS-REFERENCE TO RELATED APPLICATION

This application claims priority to and the benefit of Korean Patent Application No. 10-2021-0014324, filed on Feb. 1, 2021, in the Korean Intellectual Property Office, the entire content of which is hereby incorporated by reference.

BACKGROUND

1. Field

One or more embodiments of the present disclosure relate to a positive electrode, a lithium battery including the positive electrode, and a method of manufacturing the positive electrode.

2. Description of the Related Art

In order to meet the miniaturization and high performance features of various devices, in addition to miniaturization and weight reduction of lithium batteries, high energy density is becoming more important. In other words, high-capacity lithium batteries are becoming more important.

In order to implement a lithium battery suitable for such a use, a positive electrode having a high mixing density is being considered.

An existing positive electrode is prepared by mixing a positive active material and a binder with a carbonaceous conductive agent.

As a positive electrode contains the carbonaceous conductive agent, the cycle characteristics of the lithium battery are improved, but the density of the mixture of the positive electrode is deteriorated. As a result, the energy density of the lithium battery is deteriorated.

Therefore, it is beneficial to have a method of preventing reducing deterioration of lithium battery cycle characteristics while increasing a mixing density of a positive electrode.

SUMMARY

One or more embodiments include a novel positive electrode having excellent room temperature and high temperature lifespan characteristics.

One or more embodiments include a lithium battery having an improved energy density by including the positive electrode.

One or more embodiments include a method of manufacturing the positive electrode.

Additional aspects of embodiments will be set forth in part in the description which follows and, in part, will be apparent from the description, or may be learned by practice of the presented embodiments of the disclosure.

According to an embodiment, a positive electrode may include
a positive electrode current collector and a positive active material layer on the positive electrode current collector,
wherein the positive active material layer may include a composite positive active material and a binder,
the composite positive active material may include: a core including a lithium transition metal oxide; and a shell on and conformed to a surface of the core,
the shell may include: at least one first metal oxide represented by Formula $M_aO_b$ (wherein $0<a\leq3$ and $0<b<4$, provided that when a is 1, 2, or 3, b may not be an integer); and a carbonaceous material,
the at least one first metal oxide may be in a carbonaceous material matrix, and M may be at least one metal selected from Groups 2 to 13 and 15 and 16 of the Periodic Table of Elements,
the positive active material layer may include a carbonaceous conductive agent, and the carbonaceous conductive agent may be present only in the shell, and
a content (e.g., amount) of the first metal oxide may be 0.3 wt % or greater based on a total content (e.g., amount) of the composite positive active material.

According to another embodiment,
a lithium battery may include the positive electrode.

According to still another embodiment, a method of manufacturing a positive electrode may include:
providing a composite positive active material;
preparing a positive active material composition including the composite positive active material and a binder; and
preparing a positive electrode by providing the positive active material composition or a dry matter thereof on a positive electrode current collector,
wherein the positive active material composition may not include a carbonaceous conductive agent.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
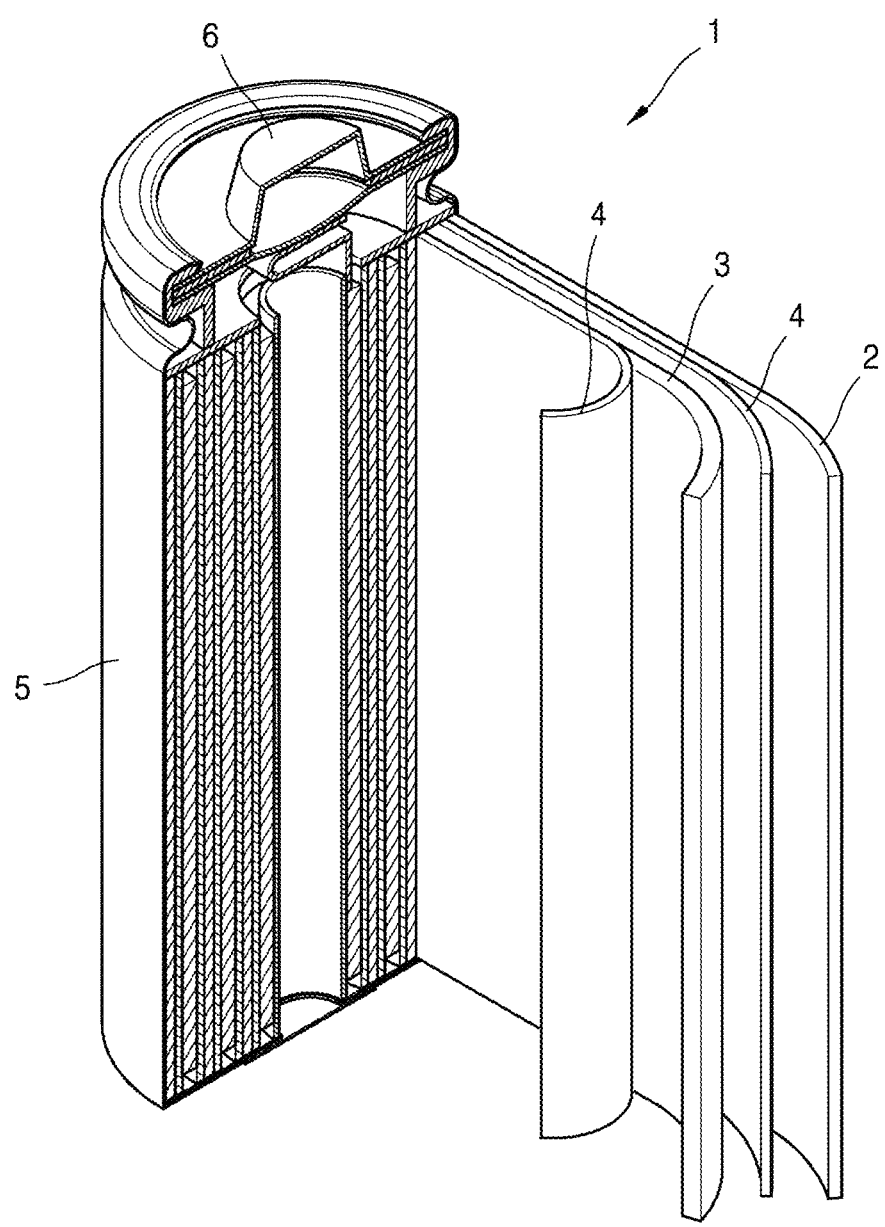
FIG. 1 is a schematic view of an embodiment of a lithium battery.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, particular embodiments will be illustrated in the drawings and described in more detail in the written description. However, this is not intended to limit the subject matter of the present disclosure to particular modes of practice, and it is to be appreciated that all changes, equivalents, and substitutes that do not depart from the spirit and technical scope of the present disclosure are encompassed in the present disclosure.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including", "having," or the like, are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. As used herein, "/" may be construed, depending on the context, as referring to "and" or "or".

In the drawings, the thicknesses of layers and regions may be exaggerated or reduced for clarity. Like reference numerals in the drawings and specification denote like elements. In the present specification, it will be understood that when an element, e.g., a layer, a film, a region, or a substrate, is referred to as being "on" or "above" another element, it can be directly on the other element or intervening layers may also be present. While such terms as "first", "second", or the like, may be used to describe various components, such components must not be limited to the above terms. The above terms are used only to distinguish one component from another.

Hereinafter, according to example embodiments, a positive electrode, a lithium battery including the positive electrode, and a method of manufacturing the positive electrode will be described in further detail.

A positive electrode may include: a positive electrode current collector and a positive active material layer on the positive electrode current collector, wherein the positive active material layer may include a composite positive active material and a binder, the composite positive active material may include: a core including a lithium transition metal oxide; and a shell on and conformed to a surface of the core, the shell may include: at least one first metal oxide represented by Formula $M_aO_b$ (wherein $0<a\leq 3$ and $0<b<4$, provided that when a is 1, 2, or 3, b may not be an integer); and a carbonaceous material, the at least one first metal oxide may be in a carbonaceous material matrix, and M may be at least metal selected from Groups 2 to 13 and 15 and 16 of the Periodic Table of Elements, the positive active material layer may include a carbonaceous conductive agent, and the carbonaceous conductive agent may be present only in the shell, and a content (e.g., amount) of the first metal oxide may be 0.3 wt % or greater based on a total content (e.g., amount) of the composite positive active material.

Hereinafter, although the present disclosure is not limited by any particular mechanism or theory, a theoretical basis for providing an excellent effect of a positive electrode according to an embodiment will be described, but the theoretical basis is described to help understanding of the subject matter of the present disclosure and is not intended to limit the present disclosure in any way.

In the positive electrode, a carbonaceous conductive agent may be present in the positive electrode by being included in a shell of a composite positive active material, and a carbonaceous conductive agent may not be present in another area of the positive electrode. In some embodiments, the positive electrode may include a composite positive active material coated with a carbonaceous conductive agent and may not additionally include a separate carbonaceous conductive agent. As the positive electrode may not include a separate conductive agent, the positive electrode may have a higher mixture density, as compared with a positive electrode further including a separate conductive agent. As a result, a lithium battery including the positive electrode may have an improved energy density.

Also, the positive electrode may include a composite positive active material having a novel structure. A shell including a first metal oxide and a carbonaceous material may be on a core of the composite positive active material. It may be difficult to coat an existing carbonaceous material on a core due to agglomeration. However, a first composite including a plurality of first metal oxides located in a matrix of a carbonaceous material is used in the composite positive active material, agglomeration of the carbonaceous material may be prevented or reduced, and a uniform shell (e.g., a substantially uniform shell) may be formed on a core. By effectively blocking or reducing contact between a core and an electrolyte, a side reaction caused by the contact (e.g., physical contact)) between the core and the electrolyte may be prevented or reduced. In addition, generation of a resistance layer may be suppressed or reduced by suppressing or reducing cation mixing by an electrolytic solution. In addition, elution of transition metal ions may also be suppressed or reduced. The carbonaceous material may be, for example, a crystalline carbonaceous material. The carbonaceous material may be, for example, a carbonaceous nanostructure. The carbonaceous material may be, for example, a two-dimensional carbonaceous nanostructure. The carbonaceous material may be, for example, graphene. In this case, because the shell containing graphene is flexible, crack occurrence inside the composite positive active material may be suppressed or reduced by easily accommodating volume change of the composite positive active material during charging and discharging. Because graphene has high electron conductivity, an interfacial resistance between the composite positive active material and the electrolyte solution is reduced. Accordingly, the internal resistance of the lithium battery may be maintained or reduced despite introduction of a shell including graphene. In addition, because the first metal oxide has high voltage resistance (e.g., high withstand voltage), it is possible to prevent or reduce deterioration of the lithium transition metal oxide included in the core during charging and discharging at a high voltage. As a result, cycle characteristics and high-temperature stability of a lithium battery containing the composite positive active material may be improved. For example, the shell may contain one type (e.g., one composition) of the first metal oxide or two or more different types (e.g., two or more different compositions) of the first metal oxide. The shell included in the composite positive active material may concurrently (e.g., simultaneously) serve as a carbonaceous conductive agent by including the carbonaceous material as described above.

Because the carbonaceous material included in the shell of the composite positive active material is derived from a graphene matrix, the carbonaceous material may have a relatively low density and high porosity, as compared with an existing carbonaceous material derived from a graphite-based material. A d002 interplanar distance of the carbonaceous material included in the shell of the composite positive active material may be, for example, 3.38 Å or greater, 3.40 Å or greater, 3.45 Å or greater, 3.50 Å or greater, 3.60 Å or greater, 3.80 Å or greater, or 4.00 Å or greater. A d002 interplanar distance of the carbonaceous material included in the shell of the composite positive active material may be, for example, in a range of about 3.38 Å to about 4.0 Å, about 3.38 Å to about 3.8 Å, about 3.38 Å to about 3.6 Å, about 3.38 Å to about 3.5 Å, or about 3.38 Å to about 3.45 Å. A d002 interplanar distance of an existing carbonaceous material derived from a graphite-based material may be, for example, 3.38 Å or less or about 3.35 Å to about 3.38 Å.

Therefore, although the positive electrode does not contain a separate carbonaceous conductive agent, by including the composite positive active material, cycle characteristics and energy density of the lithium battery including the positive electrode may be concurrently (e.g., simultaneously) improved.

A content (e.g., amount) of the shell in the composite positive active material may be, for example, in a range of about 0.5 wt % to about 3 wt %, about 0.5 wt % to about 2.5 wt %, about 0.5 wt % to about 2 wt %, or about 0.5 wt % to about 1.5 wt %, based on a total weight of the composite positive active material. In addition, a content (e.g., amount) of the first metal oxide may be in a range of about 0.3 wt % to about 1.8 wt %, about 0.3 wt % to about 1.5 wt %, about 0.3 wt % to about 1.2 wt %, or about 0.3 wt % to about 0.9 wt %, based on a total weight of the composite positive active material. The cycle characteristics of the lithium battery may be further improved as the composite positive active material contains the shell and the first metal oxide within these content (e.g., amount) ranges.

Figure 2:
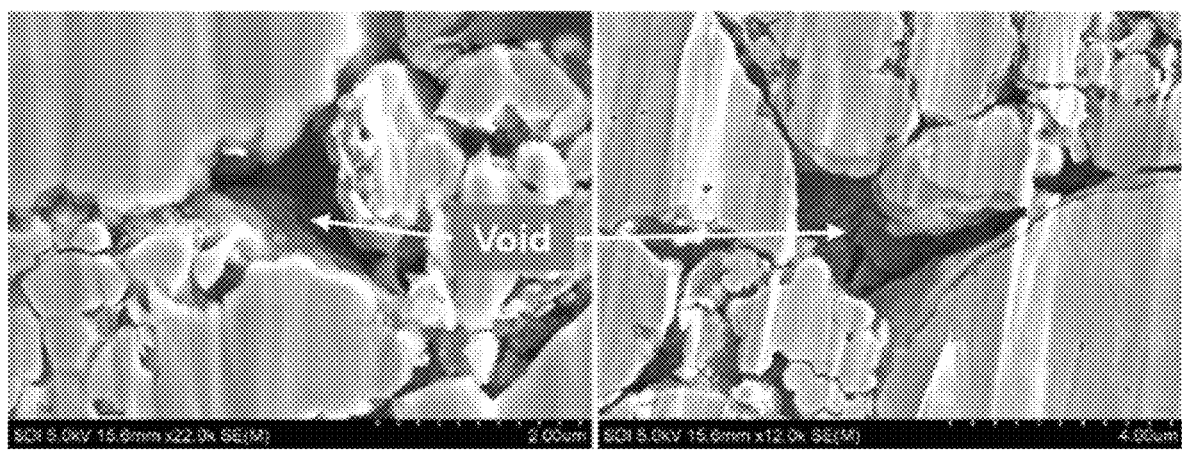
FIG. 2 is a scanning electron microscope (SEM) image of a cross-section of a positive electrode manufactured in Example 1.

As shown in FIG. 2, in a positive electrode not including a separate carbonaceous conductive agent, a positive active material layer may include a plurality of composite positive active material particles. A plurality of composite positive active material particles included in the positive electrode may be adjacent to each other, and voids may be between the adjacent composite positive active material particles. The voids may be defined by the adjacent composite positive active material particles. For example, the size and shape of the void may be defined by the adjacent composite positive active material particles. The shape of the void may be, for example, a non-spherical shape. The shape of the void may be, for example, a polyhedric shape. The sphericity of the void may be, for example, 0.9 or less, 0.8 or less, or 0.7 or less. The sphericity of the void may be, for example, a ratio of a surface area of a spherical pore of equal volume to a surface area of the void itself. As shown in FIG. 2, a plurality of voids may be, for example, irregularly and non-periodically arranged in the positive electrode.

Figure 3:
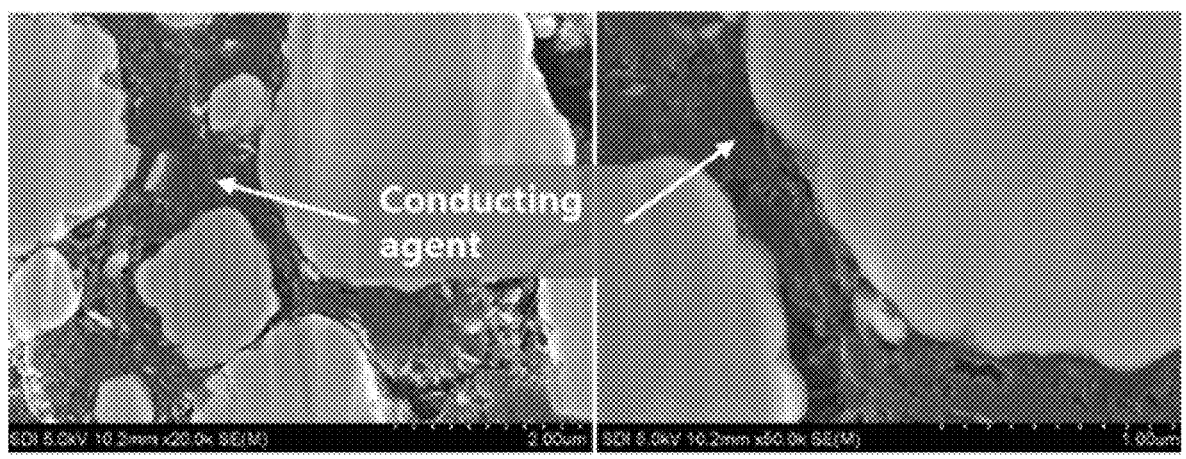
FIG. 3 is a scanning electron microscope (SEM) image of a cross-section of a positive electrode manufactured in Comparative Example 4.

As shown in FIG. 3, in a positive electrode including a separate carbonaceous conductive agent, a carbonaceous conductive agent may be filled in a space between adjacent composite positive active material particles. Therefore, there is no (or substantially no) void defined by the adjacent composite positive active material particles. For example, in a positive electrode including a separate carbonaceous conductive agent, a void may be defined by the adjacent carbonaceous conductive agent, or a void may be defined by the adjacent carbonaceous conductive agent and the composite positive active material particle.

The metal included in the first metal oxide may be at least one metal selected from Al, Nb, Mg, Sc, Ti, Zr, V, W, Mn, Fe, Co, Pd, Cu, Ag, Zn, Sb, and Se. The first metal oxide may be, for example, at least one selected from $Al_2O_z$ (wherein $0<z<3$), $NbO_x$ (wherein $0<x<2.5$), $MgO_x$ (wherein $0<x<1$), $Sc_2O_z$ (wherein $0<z<3$), $TiO_y$ (wherein $0<y<2$), $ZrO_y$ (wherein $0<y<2$), $V_2O_z$ (wherein $0<z<3$), $WO_y$ (wherein $0<y<2$), $MnO_y$ (wherein $0<y<2$), $Fe_2O_z$ (wherein $0<z<3$), $Co_3O_w$ (wherein $0<w<4$), $PdO_x$ (wherein $0<x<1$), $CuO_x$ (wherein $0<x<1$), $AgO_x$ (wherein $0<x<1$), $ZnO_x$ (wherein $0<x<1$), $Sb_2O_z$ (wherein $0<z<3$), and $SeO_y$ (wherein $0<y<2$). By providing the first metal oxide in a matrix of the carbonaceous material, uniformity of the shell arranged on the core may be improved, and voltage resistance (e.g., withstand voltage) of the composite positive active material may be further improved. For example, the shell may include $Al_2O_x$ (wherein $0<x<3$) as the first metal oxide.

The shell may further include at least one second metal oxide represented by Formula $M_aO_c$ (wherein $0<a\leq3$ and $0<c\leq4$, provided that when a is 1, 2, or 3, c may be an integer (e.g., an integer of 1 to 4). M may be at least one metal selected from Groups 2 to 13 and 15 and 16 of the Periodic Table of Elements. For example, the second metal oxide may include a metal identical to the first metal oxide, and a ratio of a to c, c/a, in the second metal oxide may be greater than a ratio of a to b, b/a, in the first metal oxide. For example, c/a>b/a. The second metal oxide may be selected from $Al_2O_3$, NbO, $NbO_2$, $Nb_2O_5$, MgO, $Sc_2O_3$, $TiO_2$, $ZrO_2$, $V_2O_3$, $WO_2$, $MnC_2$, $Fe_2O_3$, $CO_3O_4$, PdO, CuO, AgO, ZnO, $Sb_2O_3$, and $SeO_2$. The first metal oxide may be a reduction product of the second metal oxide. The first metal oxide may be obtained by reducing some or all of the second metal oxide. Accordingly, an oxygen content (e.g., amount) of the first metal oxide may be smaller than that of the second metal oxide, and the first metal oxide may have a lower oxidation number of the metal than that of the second metal oxide. For example, the shell may include $Al_2O_x$ (wherein $0<x<3$) that is the first metal oxide and $Al_2O_3$ that is the second metal oxide.

In the composite positive active material, for example, the carbonaceous material included in the shell and the transition metal of the lithium transition metal oxide included in the core may be chemically bound to each other. The carbon atom (C) of the carbonaceous material included in the shell and the transition metal (Me) of the lithium transition metal oxide may be chemically bound, for example, through a C—O-Me bond (e.g., C—O—Co bond) through an oxygen atom. The carbonaceous material contained in the shell and the lithium transition metal oxide contained in the core may be chemically bound through a chemical bond, thus the core and the shell forms a composite cathode active material. Thus, the composite cathode active material may be distinguished from a simple physical mixture of a carbonaceous material and a lithium transition metal oxide.

Also, the first metal oxide and the carbonaceous material included in the shell may be chemically bound through a chemical bond. Here, the chemical bond may be, for example, a covalent bond or an ionic bond. A covalent bond may be a bond containing at least one of an ester group, an ether group, a carbonyl group, an amide group, a carbonate anhydride group, and an acid anhydride group. An ionic bond may be, for example, a bond containing a carboxylate ion, an ammonium ion, an acyl cation group, or the like.

A thickness of the shell may be, for example, about 1 nm to about 5 μm, about 1 nm to about 1 μm, about 1 nm to about 500 nm, about 1 nm to about 200 nm, about 1 nm to about 100 nm, about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, about 1 nm to about 20 nm, or about 1 nm to about 10 nm. An increase in internal resistance of a lithium battery including the composite positive active material may be suppressed or reduced by the shell having a thickness within any of these ranges.

The positive active material may further include a third metal coated and/or doped on the core or a third metal oxide coated on the core. In addition, the shell may be on the coated and/or doped third metal or the coated third metal oxide. For example, after the third metal is coated and/or doped on a surface of the lithium transition metal oxide included in the core or the third metal oxide is coated on a surface of the lithium transition metal oxide, the shell may be on the third metal and/or the third metal oxide. For example, the composite positive active material may include a core; an interlayer on the core; and a shell on the interlayer, wherein the interlayer may include a third metal or a third metal oxide. The third metal may be at least one metal selected from Al, Zr, W, and Co, and the third metal oxide may be $Al_2O_3$, $Li_2O$—$ZrO_2$, $WO_2$, $CoO$, $CO_2O_3$, or $Co_3O_4$.

The shell included in the composite positive active material may include, for example, at least one selected from the first the metal oxide and the carbonaceous material. The shell included in the composite positive active material may include, for example, at least one selected from a first composite including the first metal oxide and graphene and a milling product of the first composite, and the first metal oxide may be located in a matrix, for example, a graphene matrix of a carbonaceous material. The shell may be, for example, prepared from a first composite including the first metal oxide and graphene. The first composite may further include a second metal oxide, in addition to the first metal oxide. The first composite may include, for example, at least two types (e.g., at least two compositions) of the first metal oxides. The first composite may include, for example, at least two types (e.g., at least two compositions) of the first metal oxides and at least two types (e.g., at least two compositions) of the second metal oxides.

A content (e.g., amount) of the first composite coated on the composite positive active material may be 3 wt % or less, 2.5 wt % or less, 2 wt % or less, or 1.5 wt % or less, based on a total weight of the composite positive active material. A content (e.g., amount) of the first composite may be in a range of about 0.5 wt % to about 3 wt %, about 0.5 wt % to about 2.5 wt %, about 0.5 wt % to about 2 wt %, or about 0.5 wt % to about 1.5 wt %, based on a total weight of the composite positive active material. When the composite positive active material includes the first composite within any of these ranges, a lithium battery including the composite positive active material may have improved cycle characteristics.

An average diameter of at least one selected from the first metal oxide and the second metal oxide included in the first composite may be in a range of about 1 nm to about 1 μm, about 1 nm to about 500 nm, about 1 nm to about 200 nm, about 1 nm to about 100 nm, about 1 nm to about 70 nm, about 1 nm to about 50 nm, about 1 nm to about 30 nm, about 3 nm to about 30 nm, about 3 nm to about 25 nm, about 5 nm to about 25 nm, about 5 nm to about 20 nm, about 7 nm to about 20 nm, or about 7 nm to about 15 nm. When the first metal oxide and/or second metal oxide has such a nano-scale diameter, the first metal oxide and/or second metal oxide may be uniformly (e.g., substantially uniformly) distributed in a matrix of a carbonaceous material of a first composite, e.g., a graphene matrix. Therefore, this first composite may be uniformly (e.g., substantially uniformly) coated on the core to form a shell. In addition, the first metal oxide and/or the second metal oxide may be more uniformly on the core by having a diameter within this range. Accordingly, high voltage resistance (e.g., high withstand voltage) may be more effectively exhibited by uniformly (e.g., substantially uniformly) providing the first metal oxide and/or the second metal oxide on the core.

The average diameter of the first metal oxide and the second metal oxide may be measured using, for example, a measuring device, of a laser diffraction method or dynamic light scattering method. In the present specification, the average diameter is a value measured by using, for example, a laser scattering particle size distribution meter (e.g., Horiba LA-920) and is a median particle diameter (D50) corresponding to 50% in an accumulated particle size distribution curve weighted by volume from a small particle.

A uniformity deviation of at least one selected from the first metal oxide and the second metal oxide included in the first composite may be 3% or less, 2% or less, or 1% or less. The uniformity may be calculated by, for example, X-ray photoelectron spectroscopy (XPS). Thus, at least one selected from the first metal oxide and the second metal oxide included in the first composite may have a deviation of 3% or less, 2% or less, or 1% or less and may be distributed uniformly (e.g., substantially uniformly).

The carbonaceous material included in the first composite, for example, may have a branched structure, and at least one metal oxide selected from the first metal oxide and the second metal oxide may be distributed in the branched structure of the carbonaceous material. The branched structure of the carbonaceous material, for example, may contain a plurality of carbonaceous material particles in contact (e.g., physical contact) with each other. The carbonaceous material may provide various conductive pathways by having a branched structure.

The carbonaceous material included in the first composite may be, for example, graphene. For example, graphene may have a branched structure, and at least one metal oxide selected from the first metal oxide and the second metal oxide may be distributed in the branched structure of the graphene. The branched structure of the graphene, for example, may contain a plurality of graphene particles in contact (e.g., physical contact) with each other. The graphene may provide various conductive pathways by having a branched structure.

The carbonaceous material included in the first composite, for example, may have a spherical structure, and at least one metal oxide selected from the first metal oxide and the second metal oxide may be distributed in the spherical structure. The size of the spherical structure of the carbonaceous material may be in a range of about 50 nm to about 300 nm. There may be a plurality of carbonaceous materials having a spherical structure. The carbonaceous material may have a spherical structure, and thus, the first composite may have a strong structure.

The carbonaceous material included in the first composite may be, for example, graphene. The graphene, for example, may have a spherical structure, and at least one metal oxide selected from the first metal oxide and the second metal oxide may be distributed in the spherical structure. The size (e.g., particle size) of the spherical structure of the graphene may be in a range of about 50 nm to about 300 nm. There may be a plurality of graphene having a spherical structure. The graphene may have a spherical structure, and thus, the first composite may have a strong structure.

The carbonaceous material included in the first composite, for example, may have a spiral structure in which a plurality of spherical structures are connected (e.g., coupled to each other, and at least one metal oxide selected from the first metal oxide and the second metal oxide may be distributed in the spherical structure of the spiral structure. The size (e.g., particle size) of the spiral structure of the carbonaceous material may be in a range of about 500 nm to about 100 μm. The carbonaceous material may have a spiral structure, and thus, the first composite may have a strong structure.

The carbonaceous material included in the first composite may be, for example, graphene. The graphene, for example, may have a spiral structure in which a plurality of spherical structures are connected (e.g., coupled to each other), and at least one metal oxide selected from the first metal oxide and the second metal oxide may be distributed in the spherical structure of the spiral structure. The size of the spiral structure of the graphene may be in a range of about 500 nm to about 100 μm. The graphene may have a spiral structure, and thus, the first composite may have a strong structure.

The carbonaceous material included in the first composite, for example, may have a cluster structure in which a plurality of spherical structures are aggregated, and at least one metal oxide selected from the first metal oxide and the second metal oxide may be distributed in the spherical structure of the cluster structure. The size of the cluster structure of the carbonaceous material may be in a range of about 0.5 mm to about 10 mm. The carbonaceous material may have a cluster structure, and thus, the first composite may have a strong structure.

The carbonaceous material included in the first composite may be, for example, graphene. The graphene, for example, may have a cluster structure in which a plurality of spherical structures are aggregated, and at least one metal oxide selected from the first metal oxide and the second metal oxide may be distributed in the spherical structure of the cluster structure. The size (e.g., particle size of the cluster structure of the graphene may be in a range of about 0.5 mm to about 10 mm. The graphene may have a cluster structure, and thus, the first composite may have a robust structure.

The first composite, for example, may be a crumpled faceted-ball structure, and at least one selected from the first metal oxide and the second metal oxide may be distributed inside or on a surface of the crumpled faceted-ball structure. As the first composite is such a faceted-ball structure, the first composite may be easily coated on irregular surface irregularities of the core.

The first composite, for example, may have a planar structure, and at least one selected from the first metal oxide and the second metal oxide may be distributed inside or on a surface of the planar structure. As the first composite is such a two-dimensional planar structure, the first composite may be easily coated on irregular surface irregularities of the core.

The carbonaceous material included in the first composite may extend by a distance of 10 nm or less from the first metal oxide and may include at least 1 to 20 carbonaceous material layers. For example, a carbonaceous material having a total thickness of 12 nm or less may be on the first metal oxide by stacking a plurality of carbonaceous material layers. For example, a total thickness of carbonaceous material may be in a range of about 0.6 nm to about 12 nm.

The carbonaceous material included in the first composite may be, for example, graphene. The graphene may extend by a distance of 10 nm or less from the first metal oxide and may include at least 1 to 20 graphene layers. For example, graphene having a total thickness of 12 nm or less may be on the first metal oxide by stacking a plurality of graphene layers. For example, a total thickness of graphene may be in a range of about 0.6 nm to about 12 nm.

The core included in the composite positive active material, for example, may include a lithium transition metal oxide represented by Formula 1 or Formula 2:

$$Li_aNi_xCo_yM_zO_{2-b}A_b \qquad \text{Formula 1}$$

wherein, in Formula 1,
0.9≤a≤1.2, 0≤b≤0.2, 0.8≤x≤0.95, 0≤y≤0.2, 0<z≤0.2, and x+y+z=1,
M may be manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and
A may be F, S, Cl, Br, or a combination thereof.

$$Li_aCo_xM_yO_{2-b}A_b \qquad \text{Formula 2}$$

wherein, in Formula 2,
1.0≤a≤1.2, 0≤b≤0.2, 0.9≤x≤1, 0≤1 x≤1, 0≤y≤0.1, and x+y=1,
M may be manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and
A may be F, S, Cl, Br, or a combination thereof.

The core included in the composite positive active material, for example, may include a lithium transition metal oxide represented by one of Formulae 3 to 5, 9, and 10:

$$LiNi_xCo_yMn_zO_2 \qquad \text{Formula 3}$$

$$LiNi_xCo_yAl_zO_2 \qquad \text{Formula 4}$$

$$LiNi_xCo_yMn_vAl_wO_2 \qquad \text{Formula 5}$$

wherein in Formulae 3 to 5, 0.8≤x≤0.95, 0<y≤0.2, 0<z≤0.2, 0<v≤0.2, 0<w≤0.2, x+y+z=1, and x+y+v+w=1.

The lithium transition metal oxides of Formulae 1 and 3 to 5 may have a high nickel content (e.g., concentration) of 80 mol % or more, 85 mol % or more, or 90 mol % or more, based on the total molar number of the transition metal, while providing excellent initial capacity, room temperature lifespan characteristics, and high temperature lifespan characteristics. For example, the lithium transition metal oxides of Formulae 1 and 3 to 5 may have a high nickel content (e.g., concentration) in a range of about 80 mol % to about 95 mol %, about 85 mol % to about 95 mol %, or about 90 mol % to about 95 mol %, based on the total molar number of the transition metal.

$$Li_aM1_xM2_yPO_{4-b}X_b \qquad \text{Formula 9}$$

wherein, in Formula 9, 0.90≤a≤1.1, 0≤x≤0.9, 0≤y≤0.5, 0.9<x+y<1.1, and 0≤b≤2,
M1 may be manganese (Mn), iron (Fe), cobalt (Co), nickel (Ni), copper (Cu), zirconium (Zr), or a combination thereof, and
M2 may be magnesium (Mg), calcium (Ca), strontium (Sr), barium (Ba), titanium (Ti), zinc (Zn), boron (B), niobium (Nb), gallium (Ga), indium (In), molybdenum (Mo), tungsten (W), aluminum (Al), silicon (Si), chromium (Cr), vanadium (V), scandium (Sc), yttrium (Y), or a combination thereof, and X may be O, F, S, P, or a combination thereof.

$$Li_aM3_zPO_4 \qquad \text{Formula 10}$$

wherein, in Formula 10, 0.90≤a≤1.1 and 0.95≤z≤1.1,
M3 may be chromium (C r), manganese (Mn), iron (Fe), cobalt (Co), nickel (Ni), copper (Cu), zirconium (Zr), or a combination thereof.

A lithium battery according to another embodiment may include the positive electrode.

By including the positive electrode, a lithium battery may provide improved cycle characteristics, thermal stability, and energy density.

The lithium battery, for example, may be manufactured by the following method, but the manufacture is not necessarily limited to the following method and may be adjusted according to required conditions.

First, the positive electrode may be manufactured. A method of manufacturing the positive electrode may be understood by referring to the description of the method of manufacturing the positive electrode provided herein.

According to embodiments, a negative electrode may be manufactured as follows. The negative electrode, for example, may be manufactured in substantially the same manner as in the manufacture of the positive electrode, except that a negative active material is used instead of the composite positive active material, and a separate conductive agent is used. In addition, in the negative active material composition, it is possible to use substantially the same conductive agent, binder, and solvent as in the positive electrode.

For example, a negative active material, a conductive agent, a binder, and a solvent may be mixed to prepare a negative active material composition. The negative active material composition may be directly coated on a copper current collector to prepare a negative electrode plate. In some embodiments, the negative active material composition may be cast on a separate support to form a negative active material film, which may then be separated from the support and laminated on a copper current collector to prepare a negative electrode plate.

In one or more embodiments, the negative active material may be any suitable negative active material for a lithium battery available in the art. For example, the negative active material may include at least one selected from lithium metal, a metal alloyable with lithium, a transition metal oxide, a non-transition metal oxide, and a carbonaceous material.

Examples of the metal alloyable with lithium include silicon (Si), tin (Sn), aluminum (Al), germanium (Ge), lead (Pb), bismuth (Bi), antimony (Sb), a Si—Y alloy (wherein Y is an alkali metal, an alkaline earth metal, a Group 13 element, a Group 14 element, a transition metal, a rare earth element, or a combination thereof, and Y is not Si), and a S n-Y alloy (wherein Y is an alkali metal, an alkaline earth-metal, a Group 13 element, a Group 14 element, a transition metal, a rare earth element, or a combination thereof, and Y is not S n). For example, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur(S), selenium (Se), tellurium (Te), polonium (Po), or a combination thereof.

For example, the transition metal oxide may be a lithium titanium oxide, a vanadium oxide, or a lithium vanadium oxide.

The non-transition metal oxide may be, for example, $SnO_2$, $SiO_x$ ($0<x<2$), and/or the like.

Examples of the carbonaceous material may include crystalline carbon, amorphous carbon, and/or a mixture thereof. Crystalline carbon, for example, may be plate-like, flake-like, spherical, or fibrous graphite, such as natural graphite and/or artificial graphite. Examples of the amorphous carbon may include soft carbon (carbon sintered at a low temperature), hard carbon, meso-phase pitch carbides, and sintered corks.

Examples of the conductive agent may include carbon black, graphite particulates, natural graphite, artificial graphite, acetylene black, carbon black (KETJEN™ BLACK), carbon fibers; carbon nanotubes; metallic materials, such as copper, nickel, aluminum, silver, and the like, in powder, fiber, or tube form; and a conductive polymer, such as a polyphenylene derivative. Any suitable conductive agent available in the art may be used.

The amounts of the negative active material, the conductive agent, the binder, and the solvent may be at any suitable level generally used in the art for lithium batteries. At least one of the conductive agent, the binder, and the solvent may be omitted according to the use and the structure of the lithium battery.

A content (e.g., amount) of the binder in the negative electrode may be, for example, in a range of about 0.1 wt % to about 10 wt % or about 0.1 wt % to about 5 wt %, based on the total weight of the negative active material layer. A content (e.g., amount) of the conductive agent in the negative electrode may be, for example, in a range of about 0.1 wt % to about 10 wt % or about 0.1 wt % to about 5 wt %, based on the total weight of the negative active material layer. A content (e.g., amount) of the negative active material in the negative electrode may be, for example, in a range of about 90 wt % to about 99 wt % or about 95 wt % to about 99 wt %, based on the total weight of the negative active material layer. When the negative active material is lithium metal, the negative electrode may not include a binder and a conductive agent.

According to embodiments, a separator to be between the positive electrode and the negative electrode is prepared.

The separator for the lithium battery may be any suitable separator that is generally used in lithium batteries. For example, the separator may have low resistance to migration of ions in an electrolyte and have electrolytic solution-retaining ability. Examples of the separator may include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium-ion battery. A separator with a good organic electrolytic solution-retaining ability may be used for a lithium-ion polymer battery.

The lithium battery, for example, may be manufactured by the following method, but the manufacture is not necessarily limited to the following method and may be adjusted according to required conditions.

First, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on the electrode to form the separator.

The polymer used for manufacturing the separator may be any suitable polymer that is used as a binder for electrodes. Examples of the polymer resin may include a vinylidene-fluoride/hexafluoropropylene copolymer, polyvinylidene fluoride (PVDF), polyacrylonitrile, polymethylmethacrylate, and a mixture thereof.

According to embodiments, an electrolyte is prepared.

The electrolyte may be, for example, an organic electrolytic solution. The organic electrolytic solution may be, for example, prepared by dissolving a lithium salt in an organic solvent.

The organic solvent may be any suitable organic solvent available in the art. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyl tetrahydrofuran, y-butyrolactone, dioxolan, 4-methyl dioxolan, N, N-dimethyl formamide, dimethyl acetamide, dimethyl sulfoxide, dioxane, 1,2-dimethoxyethane, sulfolane, dichloroethane, chlorobenzene, nitrobenzene, diethylene glycol, dimethyl ether, and a combination thereof.

The lithium salt may be any suitable lithium salt available in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a mixture thereof.

In some embodiments, the electrolyte may be a solid electrolyte. The solid electrolyte may be, for example, boron oxide and/or lithium oxynitride, but is not limited thereto. The solid electrolyte may be any suitable solid electrolyte available in the art. The solid electrolyte may be, for example, an oxide solid electrolyte and/or a sulfide solid electrolyte. A solid electrolyte may be formed on the negative electrode by a method such as, for example, sputtering, or a separate solid electrolyte sheet be formed laminated on the negative electrode.

As shown in FIG. 1, a lithium battery 1 includes a positive electrode 3, a negative electrode 2, and a separator 4. The positive electrode 3, the negative electrode 2, and the separator 4 may be wound or folded to be accommodated in a battery case 5. Then, the battery case 5 is filled with an organic electrolyte solution and sealed with a cap assembly 6, thereby completing the manufacture of the lithium battery 1. The battery case 5 may be cylindrical, but the battery case 5 is not necessarily limited thereto, and for example, the battery case 5 may be a square shape, a thin film type (or kind), and/or the like.

A pouch-type lithium battery may include at least one battery structure. The separator may be between the positive electrode and the negative electrode to provide a battery assembly. After the battery structure is laminated as a bicell structure, the battery structure may be impregnated with an organic electrolytic solution and accommodated and sealed in a pouch to provide a pouch-type lithium battery. In some embodiments, the positive electrode, the negative electrode, and the separator may be wound into an electrode assembly in a form of a jelly roll or folded and then accommodated in a pouch. Then, the organic electrolytic solution may be injected into the pouch and sealed to provide the pouch-type lithium battery.

Because the lithium battery may have excellent lifespan characteristics and rate capability, the lithium battery may be used in, for example, an electric vehicle (EV), for example, in a hybrid vehicle, such as a plug-in hybrid electric vehicle (PHEV). The lithium battery may be applicable to the high-power storage field. For example, the lithium battery may be used in an electric bicycle or a power tool.

A plurality of lithium batteries may be stacked to form a battery module, and a plurality of battery modules may form a battery pack. The battery pack may be used in a device that requires large capacity and high power, for example, in a laptop computer, a smartphone, or an electric vehicle.

The battery module, for example, may include multiple batteries and a frame that holds the multiple batteries. The battery pack, for example, may include a plurality of battery modules and a bus bar connecting the battery modules. The battery module and/or the battery pack may further include a cooling device.

A plurality of battery packs may be controlled by a battery management system. The battery management system may include a battery pack and a battery controller connected to the battery pack.

According to an embodiment, a method of manufacturing a positive electrode may include: providing a composite positive active material; preparing a positive active material composition including the composite positive active material and a binder; and preparing a positive electrode by providing the positive active material composition or a dry matter thereof on a positive electrode current collector, wherein the positive active material composition may not include a carbonaceous conductive agent.

First, a composite positive active material may be provided.

The providing of the composite positive active material may include: providing a lithium transition metal oxide; providing a first composite; and mechanically milling the lithium transition metal oxide and the first composite, wherein the first composite may include: at least one first metal oxide represented by Formula MaOb (wherein $0<a\leq3$ and $0<b<4$, provided that a is 1, 2, or 3, b may not be an integer); and a carbonaceous material, and the at least one first metal oxide may be in the carbonaceous material matrix, and M may be at least metal selected from Groups 2 to 13 and 15 and 16 of the Periodic Table of Elements. The carbonaceous material may be graphene.

Then, a lithium transition metal oxide may be provided. The lithium transition metal oxide may be, for example, a compound represented by one of Formulae 1 to 5, 9 and 10.

The providing of the first composite may include, for example, providing a reaction gas including a carbon source gas to a structure including a metal oxide and heat-treating.

The providing of the first composite may include, for example, providing at least one second metal oxide represented by $M_aO_c$ (wherein $0<a\leq3$ and $0<c\leq4$, provided that a is 1, 2, or 3, c may be an integer) with a reaction gas including a carbon source gas and heat-treating, and M may be at least metal selected from Groups 2 to 13 and 15 and 16 of the Periodic Table of Elements.

The carbon source gas may be a compound represented by Formula 6 or at least one mixture gas selected from a compound represented by Formula 6, a compound represented by Formula 7 and an oxygen-containing gas represented by Formula 8:

$$CnH_{(2n+2-a)}[OH]_a \quad \text{Formula 6}$$

wherein, in Formula 6, n may be 1 to 20, and a may be 0 or 1;

$$CnH_{2n} \quad \text{Formula 7}$$

wherein, in Formula 2, n may be 2 to 6; and

$$C_xH_yO_z \quad \text{Formula 8}$$

wherein, in Formula 3, x may be 0 or an integer from 1 to 20, y may be 0 or an integer from 1 to 20, and z may be 1 or 2.

The compound represented by Formula 6 and the compound represented by Formula 7 may be at least one selected from the group consisting of methane, ethylene, propylene, methanol, ethanol, and propanol. The oxygen-containing gas represented by Formula 8, for example, may include carbon dioxide ($CO_2$) and carbon monoxide (CO), water vapor ($H_2O$), or a mixture thereof.

After the providing of a reaction gas including a carbon source gas to the second metal oxide represented by $M_aO_c$ (wherein 0<a≤3 and 0<c≤4, provided that when a is 1, 2, or 3, c may be an integer) and heat-treating, cooling by using at least one inert gas selected from the group consisting of nitrogen, helium, and argon may be further performed. The cooling may refer to adjusting the temperature to room temperature (20° C. to 25° C.). The carbon source gas may include at least one inert gas selected from the group consisting of nitrogen, helium, and argon.

In the method of preparing a first composite, a process of growing a carbonaceous material, e.g., graphene, according to a gas phase reaction, may be performed under various suitable conditions.

In the first condition, for example, first, methane may be provided to a reactor, in which the second metal oxide represented by $M_aO_c$ (wherein 0<a≤3 and 0<c≤4, provided that when a is 1, 2, or 3, c may be an integer) is provided, and the temperature may be raised to a heat treatment temperature (T). A heating time up to the heat treatment temperature (T) may be in a range of about 10 minutes to about 4 hours, and the heat treatment temperature (T) may be in a range of 700° C. to 1,100° C. The heat-treating may be performed during a reaction time at the heat treatment temperature (T). The reaction time may be, for example, in a range of about 4 hours to about 8 hours. The heat-treated product may be cooled to prepare a first composite. The time taken for the cooling from the heat treatment temperature (T) to room temperature may be, for example, in a range of about 1 hour to about 5 hours.

In the second condition, for example, first, hydrogen may be provided to a reactor, in which the second metal oxide represented by $M_aO_c$ (wherein 0<a≤3 and 0<c≤4, provided that when a is 1, 2, or 3, c may be an integer) is provided, and the temperature may be raised to a heat treatment temperature (T). A heating time up to the heat treatment temperature (T) may be in a range of about 10 minutes to about 4 hours, and the heat treatment temperature (T) may be in a range of 700° C. to 1,100° C. After heat-treating at the heat treatment temperature (T) for a certain reaction time, methane gas may be provided, and heat-treating may be further performed for the remaining reaction time. The reaction time may be, for example, in a range of about 4 hours to about 8 hours. The heat-treated product may be cooled to prepare a first composite. In or during the cooling, nitrogen may be provided thereto. The time taken for the cooling from the heat treatment temperature (T) to room temperature may be, for example, in a range of about 1 hour to about 5 hours.

In the third condition, for example, first, hydrogen may be provided to a reactor, in which the second metal oxide represented by $M_aO_c$ (wherein 0<a≤3 and 0<c≤4, provided that when a is 1, 2, or 3, c may be an integer) is provided, and the temperature may be raised to a heat treatment temperature (T). A heating time up to the heat treatment temperature (T) may be in a range of about 10 minutes to about 4 hours, and the heat treatment temperature (T) may be in a range of 700° C. to 1,100° C. After heat-treating at the heat treatment temperature (T) for a certain reaction time, a mixed gas of methane and hydrogen may be provided, and heat-treating may be further performed for the remaining reaction time. The reaction time may be, for example, in a range of about 4 hours to about 8 hours. The heat-treated product may be cooled to prepare a first composite. In the cooling, nitrogen may be provided thereto. The time taken for the cooling from the heat treatment temperature (T) to room temperature may be, for example, in a range of about 1 hour to about 5 hours.

In the preparing of a first composite, when the carbon source gas contains water vapor, a first composite having excellent conductivity may be obtained. A content (e.g., amount) of water vapor in the gas mixture is not limited, and for example, in a range of about 0.01% to about 10% by volume based on 100% by volume of the total carbon source gas. The carbon source gas may be: for example, methane; a mixed gas containing methane and an inert gas; or a mixed gas containing methane and an oxygen-containing gas.

The carbon source gas may be: for example, methane; a mixed gas containing methane and carbon dioxide; or a mixed gas containing methane, carbon dioxide, and water vapor. In the mixed gas of methane and carbon dioxide, a molar ratio of methane to carbon dioxide may be in a range of about 1:0.20 to about 1:0.50, about 1:0.25 to about 1:0.45, or about 1:0.30 to about 1:0.40. In the mixed gas of methane, carbon dioxide, and water vapor, a molar ratio of methane to carbon dioxide to water vapor may be in a range of about 1:0.20 to about 0.50:0.01 to about 1.45, about 1:0.25 to about 0.45:0.10 to about 1.35, or about 1:0.30 to about 0.40:0.50 to about 1.0.

The carbon source gas may be, for example, carbon monoxide or carbon dioxide. The carbon source gas may be, for example, a mixed gas of methane and nitrogen. In the mixed gas of methane and nitrogen, a molar ratio of methane to nitrogen may be in a range of about 1:0.20 to about 1:0.50, about 1:0.25 to about 1:0.45, or about 1:0.30 to about 1:0.40. The carbon source gas may not include an inert gas such as nitrogen.

The heat treatment pressure may be selected in consideration of the heat treatment temperature, the composition of a gas mixture, and/or the desired amount of carbon coating. The heat treatment pressure may be controlled by adjusting the amount of the gas mixture flowing in and the amount of the gas mixture flowing out. The heat treatment pressure may be, for example, 0.5 atm or more, 1 atm or more, 2 atm or more, 3 atm or more, 4 atm or more, or 5 atm or more.

The heat treatment time is not particularly limited, and may be suitably or appropriately adjusted according to the heat treatment temperature, the pressure during heat treatment, the composition of a gas mixture, and/or the desired amount of carbon coating. For example, the reaction time at the heat treatment temperature may be, for example, about 10 minutes to about 100 hours, about 30 minutes to about 90 hours, or about 50 minutes to about 40 hours. For example, as the heat treatment time increases, the amount of deposited carbon, e.g., graphene, may increase, and accordingly, electrical properties of the first composite may be improved. However, this trend may not necessarily be directly proportional to time. For example, after a set or predetermined time has elapsed, carbon deposition, e.g., graphene deposition, may no longer occur, or a deposition rate may be lowered.

Through a gas phase reaction of the carbon source gas described above, even at a relatively low temperature, a first composite may be obtained by providing uniform (e.g., substantially uniform) coating of a carbonaceous material, e.g., coating of graphene, to at least one of the second metal oxide represented by $M_aO_c$ (wherein 0<a≤3 and 0<c≤4, provided that when a is 1, 2, or 3, c may be an integer) and a reduction product thereof that is the first metal oxide represented by $M_aO_b$ (wherein 0<a≤3 and 0<b<4, provided that when a is 1, 2, or 3, b may be an integer).

The first composite may include: for example, a carbonaceous material matrix, for example, a graphene matrix, having at least one structure selected from a spherical structure, a spiral structure in which a plurality of spherical structures are connected, a cluster structure in which a plurality of spherical structures are aggregated, and a sponge structure; and at least one of the second metal oxide represented by $M_aO_c$ (wherein 0<a≤3 and 0<c≤4, provided that when a is 1, 2, or 3, c may be an integer) and a reduction product thereof that is the first metal oxide represented by $M_aO_b$ (wherein 0<a≤3 and 0<b<4, provided that when a is 1, 2, or 3, b may be an integer) in the carbonaceous material matrix.

According to embodiments, the lithium transition metal oxide and the first composite may be mechanically milled to form a composite cathode active material. A NOBILTA™ mixer or the like may be used during the milling. The number of rotations of the mixer during the milling may be, for example, 1,000 rpm to 2,500 rpm. When the milling rate is less than 1,000 rpm, a shear force applied to the lithium transition metal oxide and the first composite may be weak, and thus, it is difficult to form a chemical bond between the lithium transition metal oxide and the first composite. When the milling rate is excessively high, because the first composite may proceed in an excessively short time, it may be difficult for the first composite to be uniformly (e.g., substantially uniformly) coated on the lithium transition metal oxide to form a uniform (e.g., substantially uniform) and continuous shell. The milling time may be, for example, about 5 minutes to about 100 minutes, about 5 minutes to about 60 minutes, or about 5 minutes to about 30 minutes. When the milling times is excessively short, it may be difficult for the first composite to be coated on the lithium transition metal oxide to form a uniform (e.g., substantially uniform) and continuous shell. When the milling time is excessively long, the production efficiency may decrease. A content (e.g., amount) of the first composite may be 3 wt % or less, 2.5 wt % or less, 2 wt % or less, or 1.5 wt % or less, based on the total weight of the lithium transition metal oxide and the first composite. For example, a content (e.g., amount) of the first composite may be in a range of about 0.5 parts to about 3 parts by weight, about 0.5 parts to about 2.5 parts by weight, about 0.5 parts to about 2 parts by weight, or about 0.5 parts to about 1.5 parts by weight, based on 100 parts by weight of the mixture of the lithium transition metal oxide and the first composite.

An average diameter (D50) of the first composite used in mechanical milling of the lithium transition metal oxide and the first composite may be, for example, in a range of about 1 μm to about 20 μm, about 3 μm to about 15 μm, or about 5 μm to about 10 μm.

According to embodiments, a positive active material composition including a composite positive active material and a binder may be prepared, and the positive active material composition or a dry matter thereof may be provided on the positive electrode current collector to prepare a positive electrode.

The positive electrode, for example, may be manufactured by the following method, but the manufacture is not necessarily limited to the following method and may be adjusted according to required conditions.

First, the composite positive active material prepared above, a binder, and a solvent may be mixed to form a positive active material composition. The prepared positive active material composition may be directly coated on an aluminum current collector and dried to prepare a positive electrode plate having a formed positive active material layer. In some embodiments, the positive active material composition may be cast on a separate support, which then may be separated from the support and laminated on an aluminum current collector to prepare a positive electrode plate having a formed positive active material layer. The positive active material composition may not include a separate carbonaceous conductive agent other than the composite positive active material.

The positive active material composition may or may not additionally include a metal-based conductive agent and/or conductive polymer. Examples of the metal-based conductive agent include metal powder, metal fiber, or metal tube of copper, nickel, aluminum, or silver. Examples of the conductive polymer may be a polyphenylene derivative, but embodiments are not limited thereto. Any suitable metal-based conductive agent and/or conductive polymer available in the art may be used.

Vinylidene fluoride/hexafluoropropylene copolymer, polyvinylidene fluoride, polyacrylonitrile, polymethyl methacrylate, polytetrafluoroethylene (PTFE), a mixture thereof, or a styrene butadiene-rubber polymer may be used as a binder. N-methyl pyrrolidone (NMP), acetone, or water may be used as a solvent, but embodiments are not limited thereto. Any suitable binder and solvent available in the art may be used.

It is also possible to form pores inside an electrode plate by adding a plasticizer or a pore former to the positive active material composition.

The amounts of the composite positive active material, the binder, and the solvent used in the positive electrode may be used in any suitable range that is generally used in lithium batteries. At least one of the binder and the solvent may be omitted according to the use and the structure of the lithium battery. A content (e.g., amount) of the binder in the positive electrode may be in a range of about 0.1 wt % to about 10 wt % or about 0.1 wt % to about 5 wt %, based on the total weight of the positive active material layer. A content (e.g., amount) of the positive active material in the positive electrode may be, for example, in a range of about 90 wt % to about 99 wt % or about 95 wt % to about 99 wt %, based on the total weight of the positive active material layer.

In addition, the positive electrode may additionally include an other general positive active material in addition to the above-described composite positive active material.

The general positive active material may be any suitable positive active material available in the art, and for example, may be a lithium-containing metal oxide. For example, at least one composite oxide of a metal selected from cobalt, manganese, nickel, and a combination thereof and lithium may also be used. Examples thereof include a compound represented by any one of: $Li_aA_{1-b}B'_bD_2$ (wherein 0.90≥a≥1 and 0≥b≥0.5); $Li_aE_{1-b}B'_bO_{2-c}D_c$ (wherein 0.90≥a≥1, 0≥b≥0.5, and 0≥c≥0.05); $LiE_{2-b}B'_bO_{4-c}D_c$ (wherein 0≥b≥0.5 and 0≥c≥0.05); $Li_aNi_{1-b-c}Co_bB'_cD_a$ (wherein 0.90≥a≥1, 0≥b 0.5, 0≥c≥0.05, and 0≤a≤2); $Li_aNi_{1-b-c}Co_bB'_cO_{2-a}F'_a$ (wherein 0.90≥a≥1, 0≥b≥0.5, 0≥c≥0.05, and 0≤a≤2); $Li_aNi_{1-b-c}Co_bB'_cO_{2-a}F'_2$ (wherein 0.90≥a≥1, 0≥b 0.5, 0≥c≥0.05, and 0≤a≤2); $Li_aNi_{1-b-c}Mn_bB'_cD_a$ (wherein 0.90≥a≥1, 0≥b≥0.5, 0≥c≥0.05, and 0≤a≤2); $Li_aNi_{1-b-c}Mn_bB'_cO_{2-a}F'_a$ (wherein 0.90≥a≥1, 0≥b≥40.5, 0≥c≥0.05, and 0<a<2); $Li_aNi_{1-b-c}Mn_bB'_cO_{2-a}F'_2$ (wherein 0.90≥a≥1, 0≥b≥0.5, $0 \geq c \geq 0.05$, and $0 < a < 2$); $Li_aNi_bE_cG_dO_2$ (wherein $0.90 \geq a \geq 1$, $0 \geq b \geq 0.9$, $0 \geq c \geq 0.5$, and $0.001 \geq d \geq 0.1$); $Li_aNi_bCo_cMn_dG_eO_2$ (wherein $0.90 \geq a \geq 1$, $0 \geq b \geq 0.90$, $\geq c \geq 0.5$, $0 \geq d \geq 0.5$, and $0.001 \geq e \geq 0.1$); $Li_aNiG_bO_2$ (wherein $0.90 \geq a \geq 1$ and $0.001 \geq b \geq 0.1$); $Li_aCoG_bO_2$ (wherein $0.90 \geq a \geq 1$ and $0.001 \geq b \geq 0.1$); $Li_aMnG_bO_2$ (wherein $0.90 \geq a \geq 1$ and $0.001 \geq b \geq 0.1$); $Li_aMn_2G_bO_4$ (wherein $0.90 \geq a \geq 1$ and $0.001 \geq b \geq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \geq f \geq 2)$; $Li_{(3-f)}Fe_2(PO_4)_3 (0 \geq f \geq 2)$; and $LiFePO_4$:

In the foregoing formulae, A may be selected from nickel (Ni), cobalt (Co), manganese (Mn), and a combination thereof; B' may be selected from aluminum (Al), Ni, Co, Mn, chromium (Cr), iron (Fe), magnesium (Mg), strontium (Sr), vanadium (V), a rare-earth element, and a combination thereof; D may be selected from oxygen (O), fluorine (F), sulfur (S), phosphorus (P), and a combination thereof; E may be selected from Co, Mn, and a combination thereof; F' may be selected from F, S, P, and a combination thereof; G may be selected from Al, Cr, Mn, Fe, Mg, lanthanum (La), cerium (Ce), Sr, V, and a combination thereof; Q may be selected from titanium (Ti), molybdenum (Mo), Mn, and a combination thereof; I' may be selected from Cr, V, Fe, scandium (Sc), yttrium (Y), and a combination thereof; and J may be selected from V, Cr, Mn, Co, Ni, copper (Cu), and a combination thereof.

A compound added with a coating layer formed on one of these compounds may also be used, and a mixture of these compounds and a compound added with a coating layer may also be used. In one or more embodiments, the coating layer added on a surface of these compounds may include at least one compound of a coating element selected from the group consisting of oxide, hydroxide, oxyhydroxide, oxycarbonate, and hydroxycarbonate of the coating element. In one or more embodiments, these compounds constituting the coating layer may be amorphous or crystalline. In one or more embodiments, the coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. A method of forming a coating layer may be selected within a range of not affecting physical properties of the positive active material. The coating method may be, for example, a spray coating method and/or a dipping method. The detailed description of the coating method is not provided here because the method is easily understood by one of ordinary skill in the art.

Hereinafter example embodiments will be described in more detail with reference to Examples and Comparative Examples. These examples are provided for illustrative purposes only and are not intended to limit the scope of the present disclosure.

Preparation of First Composite

Preparation Example 1: $Al_2O_3$ Embedded in Graphene First Composite $Al_2O_3$ particles (having an average diameter of about 20 nm) were placed in a reactor, $CH_4$ was supplied into the reactor at about 300 sccm, at 1 atm, for about 30 minutes, and then the inner temperature in the reactor was raised to 1,000° C.

Then, heat-treating was performed at the same temperature for 7 hours. Then, the inner temperature of the reactor was adjusted to room temperature (from 20° C. to 25° C.) to thereby obtain a first composite in which $Al_2O_3$ particles and $Al_2O_z$ ($0<z<3$) particles, a reduction product thereof, are embedded in graphene.

The content (e.g., amount) of alumina in the first composite was 60 wt %.

Comparative Preparation Example 1: $SiO_2$ Embedded in Graphene First Composite $SiO_2$ particles (having an average diameter of about 15 nm) were placed in a reactor, $CH_4$ was supplied into the reactor at about 300 sccm, at 1 atm, for about 30 minutes, and then the inner temperature in the reactor was raised to 1,000° C.

Then, heat-treating was performed at the same temperature for 7 hours. Then, the inner temperature of the reactor was adjusted to room temperature (from 20° C. to 25° C.) to thereby obtain a first composite in which $SiO_2$ particles and $SiO_y$ ($0<y<2$) particles, a reduction product thereof, are embedded in graphene.

Preparation of Composite Positive Active Material

Manufacture Example 1: $Al_2O_3$ Embedded in Graphene First Composite 1.2 Wt % (Alumina 0.72 wt %) Coating NCA91 ($LiNi_{0.91}Co_{0.05}Al_{0.04}O_2$)

$LiNi_{0.91}Co_{0.05}Al_{0.04}O_2$ (hereinafter, referred to as NCA91) and the first composite prepared in Preparation Example 1 were milled by using a NOBILTA™ Mixer (Hosokawa, Japan) at a rotation number of about 1,000 rpm to 2,000 rpm for about 5 to 30 minutes to thereby obtain a composite positive active material.

A mixing weight ratio of NCA91 to the first composite prepared in Preparation Example 1 was 98.8:1.2.

Manufacture Example 2: $Al_2O_3$ Embedded in Graphene First Composite 0.8 Wt % (Alumina 0.48 wt %) Coating NCA91

A composite positive active material was manufactured in substantially the same manner as in Manufacture Example 1, except that a mixing weight ratio of NCA91 to the first composite prepare in Preparation Example 1 was adjusted to 99.2:0.8.

Manufacture Example 3: $Al_2O_3$ Embedded in Graphene First Composite 1.0 Wt % (Alumina 0.6 wt %) Coating NCA91

A composite positive active material was manufactured in substantially the same manner as in Manufacture Example 1, except that a mixing weight ratio of NCA91 to the first composite prepare in Preparation Example 1 was adjusted to 99.0:1.0.

Comparative Manufacture Example 1: Bare NCA91

NCA91 was used as a positive active material.

Comparative Manufacture Example 2: $Al_2O_3$ Embedded in Graphene First Composite 0.4 wt % (Alumina 0.24 wt %) Coating NCA91

A composite positive active material was manufactured in substantially the same manner as in Manufacture Example 1, except that a mixing weight ratio of NCA91 to the first composite prepare in Preparation Example 1 was adjusted to 99.6:0.4.

Manufacture of Lithium Battery (Half-Cell)

Example 1: $Al_2O_3$ Embedded in Graphene First Composite 1.2 wt % Coating NCA91+Conductive Agent 0 wt %

Manufacture of Positive Electrode

A mixture of the composite positive active material prepared in Manufacture Example 1, a carbon conductive agent, and polyvinylidene fluoride (PVdF) at a weight ratio of 98:0:2 was mixed with N-methyl pyrrolidone (NMP) in agate mortars with pestles to thereby manufacture a slurry. That is, a separate carbonaceous conductive agent was not used. The slurry was bar-coated on an aluminium current collector having a thickness of 15 μm, followed by drying at room temperature and drying again in vacuum at a temperature of 120° C. Then, hot-pressing and punching was performed, thereby completing the manufacture of a positive electrode plate having a thickness of 55 μm.

Manufacture of Coin-Cell

A coin-cell was manufactured by using the prepared positive electrode plate, lithium metal as a counter electrode, a PTFE separator, and a solution in which 1.3 M $LiPF_6$ was dissolved in ethylene carbonate (EC)+ethylmethyl carbonate (EMC)+dimethyl carbonate (DMC) (at a volume ratio of 3:4:3).

Example 2: $Al_2O_3$ Embedded in Graphene First Composite 0.8 wt % Coating NCA91+Conductive Agent 0 wt %

A coin-cell was manufactured in substantially the same manner as in Example 1, except that the composite positive active material prepared in Manufacture Example 2 was used instead of the composite positive active material prepared in Manufacture Example 1.

Example 3: $Al_2O_3$ Embedded in Graphene First Composite 1.0 wt % Coating NCA91+Conductive Agent 0 wt %

A coin-cell was manufactured in substantially the same manner as in Example 1, except that the composite positive active material prepared in Manufacture Example 3 was used instead of the composite positive active material prepared in Manufacture Example 1.

Comparative Example 1: Bare NCA91+Conductive Agent 2 wt %

Manufacture of Positive Electrode

A mixture of the positive active material prepared in Comparative Manufacture Example 1, a carbon conductive agent (DENKA™ BLACK), and polyvinylidene fluoride (PVdF) at a weight ratio of 96:2:2 was mixed with N-methyl pyrrolidone (NMP) in agate mortars with pestles to thereby manufacture a slurry. The slurry was bar-coated on an aluminum current collector having a thickness of 15 μm, followed by drying at room temperature and drying again in vacuum at a temperature of 120° C. Then, hot-pressing and punching was performed, thereby completing the manufacture of a positive electrode plate having a thickness of 55 μm.

Manufacture of Coin-Cell

A coin-cell was manufactured in substantially the same manner as in Example 1.

Comparative Example 2: Bare NCA91+Conductive Agent 0 wt %

A positive electrode and a coin-cell were manufactured in substantially the same manner as in Example 1, except that the positive active material prepared in Comparative Manufacture Example 1 was used instead of the composite positive active material prepared in Manufacture Example 1.

Comparative Example 3: $Al_2O_3$ Embedded in Graphene First Composite 0.4 Wt % (Alumina 0.24 wt %) Coating NCA91+Conductive Agent 0 wt %

A positive electrode and a coin-cell were manufactured in substantially the same manner as in Example 1, except that the positive active material prepared in Comparative Manufacture Example 2 was used instead of the composite positive active material prepared in Manufacture Example 1.

Comparative Example 4: $Al_2O_3$ Embedded in Graphene First Composite 1.2 Wt % Coating NCA91+Conductive Agent 2 wt %

A positive electrode and a coin-cell were manufactured in substantially the same manner as in Example 1, except that the composite positive active material prepared in Manufacture Example 1, a carbon conductive agent (DENKA™ BLACK), and polyvinylidene fluoride (PVdF) were mixed at a weight ratio of 96:2:2, and
a content (e.g., amount) of a conductive agent was changed from 0 wt % to 2 wt %.

Evaluation Example 1: X-Ray Photoelectron Spectroscopy (XPS) Spectrum Evaluation An XPS spectrum was measured using a QUANTUM 2000™ (PHYSICAL ELECTRONICS™) overtime during the preparation of the first composite prepared in Preparation Example 1. XPS spectra of C is orbital and Al $2p$ orbital were measured before, after 1 minute, after 5 minutes, after 30 minutes, after 1 hour, and after 4 hours a temperature increase for each sample. In an initial stage of the temperature increase, only the peak for Al $2p$ orbital was shown, and the peak for C is orbital was not observed. After 30 minutes, the peak for C is orbital was shown clearly, and the size of the peak for Al $2p$ orbital was significantly reduced.

After 30 minutes, peaks for C is orbital due to C=C bonding and C—C bonding due to graphene growth were clearly shown near 284.5 eV.

As the reaction time elapsed, an oxidation number of aluminum decreased, and the peak position of Al $2p$ orbital shifted toward a lower binding energy (eV).

Therefore, it was confirmed that graphene grew on $Al_2O_3$ particles as the reaction proceeded, and $Al_2O_x$ (0<x<3), which is a reduction product of $Al_2O_3$, was generated.

Average contents (e.g., amounts) of carbon and aluminum were measured through XPS analysis results in 10 areas of the first composite sample prepared in Preparation Example 1. For the measurement results, the deviation of the aluminum content (e.g., concentration) for each area was calculated. The deviation of the aluminum content was expressed as a percentage of the average value, and this value was called uniformity. The percentage of the average value of the deviation of the aluminum content, that is, the uniformity of the aluminum content was 1%. Therefore, it was confirmed that the alumina was uniformly (e.g., substantially uniformly) distributed in the first composite prepared in Preparation Example 1.

Evaluation Example 2: Scanning Electron Microscopy (SEM), High-Resolution Transmission Electron Microscopy (HR-TEM), and SEM-Energy Dispersive x-Ray Spectroscopy (EDAX) Analysis The first composite prepared in P reparation Example 1, the composite positive active material prepared in Manufacture Example 1, and bare NCA91 of Comparative Manufacture Example 1 were subjected to SEM, HR-TEM, and EDX analysis. For SEM-EDAX analysis, FEI Titan 80-300 available from Philips was used.

The first composite prepared in Preparation Example 1 was found to have a structure in which $Al_2O_3$ particles and $Al_2O_z$ (wherein $0<z<3$) particles, a reduction product thereof, are embedded in graphene. It was confirmed that a graphene layer was on an outer surface of at least one particle selected from $Al_2O_3$ particle and $Al_2O_z$ (wherein $0<z<3$). The at least one particle selected from $Al_2O_3$ particles and $Al_2O_z$ (wherein $0<z<3$) particles was uniformly (e.g., substantially uniformly) dispersed in the graphene matrix. A diameter of at least one of $Al_2O_3$ particles and $Al_2O_z$ (wherein $0<z<3$) particles was about 20 nm. A diameter of the first composite prepared in Preparation Example 1 was in a range of about 100 nm to about 200 nm.

In the composite positive active material prepared in Manufacture Example 1, a shell formed of a first composite including graphene was on the NCA91 core.

The bare NCA91 of Comparative Manufacture Example 1 and the composite positive active material prepared in Manufacture Example 1 were subjected to SEM-E DAX analysis.

As compared with the surface of the bare NCA91 of the composite positive active material of Comparative Manufacture Example 1, the surface of the composite positive active material of Manufacture Example 1 was found to have an increased concentration of distributed aluminum (Al). Accordingly, it was found that the first composite prepared in Preparation Example 1 was uniformly (e.g., substantially uniformly) coated to form a shell on the NCA core of the composite positive active material of Manufacture Example 1.

Evaluation Example 3: SEM Analysis on Cross-Section of Positive Electrode

SEM analysis of a cross-section of a positive electrode of each of Example 1 and Comparative Example 4 was performed.

FIG. 2 shows a cross-section of the positive electrode manufactured in Example 1.

FIG. 3 shows a cross-section of the positive electrode manufactured in Comparative Example 4.

As shown in FIG. 2, as the positive electrode of Example 1 did not include a conductive agent, a void was present between the composite positive active material particles.

As shown in FIG. 3, as the positive electrode of Comparative Example 4 included a conductive agent, the conductive agent was present between the composite positive active material particles.

Accordingly, in a lithium battery including the positive electrode of Example 1 and a liquid electrolyte, an electrolytic solution may be present in the void between the composite positive active material particles to improve ionic conductivity.

In contrast, in a battery including the positive electrode of Comparative Example 4 and a liquid electrolyte, the conductive agent is filled in the space between the composite positive active material particles. Thus, a content (e.g., amount) of electrolytic solution in the space between the positive active material particles may be reduced.

Accordingly, a lithium battery including the positive electrode of Comparative Example 4 may have a reduced ionic conductivity, increased internal resistance of the lithium battery, and consequently deteriorated cycle characteristics of the lithium battery, as compared with a lithium battery including the positive electrode of Example 1. In addition, as a thickness of the positive electrode increases, the difference in cycle characteristics due to the difference in ionic conductivity may be more significant.

Evaluation Example 4: Evaluation of Charge/Discharge Characteristics at Room Temperature Each of the lithium batteries manufactured in Examples 1 to 3 and Comparative Examples 1 to 4 was charged with a constant current of 0.1 C rate at 25° C. until a voltage of about 4.4 V (vs. Li), and maintained at a constant voltage of 4.4 V (constant voltage mode) until a cutoff current of 0.05 C rate. Subsequently, the lithium batteries were discharged with a constant current of 0.1 C rate until the voltage reached 3.0 V (vs. Li) (formation cycle).

Each of the lithium batteries that underwent the formation cycle was charged with a constant current of 0.2 C rate at 25° C. until the voltage reached 4.25 V (vs. Li), and a constant voltage of 4.25 V (constant voltage mode) was maintained until a cutoff current of 0.05 C rate was reached. Subsequently, each of the lithium batteries was discharged with a constant current of 0.2 C rate until the voltage reached 3.0 V (vs. Li) ($1^{st}$ cycle).

Each of the lithium batteries that underwent the $1^{st}$ cycle was charged with a constant current of 1.0 C rate at 25° C. until the voltage reached 4.25 V (vs. Li), and a constant voltage of 4.25 V (constant voltage mode) was maintained until a cutoff current of 0.05 C rate was reached. Subsequently, each of the lithium batteries was discharged with a constant current of 1.0 C rate until the voltage reached 3.0 V (vs. Li) ($2^{nd}$ cycle). These cycles were repeated for 50 cycles under the same conditions until the $50^{th}$ cycle.

Some results of the charge/discharge test at room temperature are shown in Table 1. A capacity retention at the $50^{th}$ cycle may be defined by Equation 1. An initial efficiency in the formation process may be defined by Equation 2.

Capacity retention(%)=(discharge capacity at the $50^{th}$ cycle/discharge capacity at the $1^{st}$ cycle)×100%   Equation 1

Initial efficiency(%)=(discharge capacity at the formation cycle/charge capacity at the formation cycle]×100%   Equation 2

TABLE 1

|  | Capacity retention (%) | Initial efficiency (%) |
|---|---|---|
| Example 1: | 95.1 | 90.8 |
| Example 2 | 93.4 | 90.5 |
| Example 3 | 94.2 | 90.7 |
| Comparative Example 1 | 92.9 | 91.1 |
| Comparative Example 2 | 32.4 | 89.7 |
| Comparative Example 3 | 12.7 | 90.1 |
| Comparative Example 4 | Not measured | 90.7 |

As shown in Table 1, the lithium batteries of Examples 1 to 3 were found to have improved lifespan characteristics at room temperature, as compared with the lithium batteries of Comparative Examples 1 to 3.

The lithium batteries of Examples 1 to 3 were found to have significantly improved lifespan characteristics at room temperature, as compared with the lithium batteries of Comparative Examples 2 and 3 not including a conductive agent.

In addition, the lithium battery of Example 1 not including a conductive agent was found to have an improved initial efficiency, as compared with the lithium battery of Comparative Example 4 including a conductive agent.

Evaluation Example 5: Evaluation of High-Voltage Charge/Discharge Characteristics at High Temperature Each of the lithium batteries manufactured in Examples 1 to 3 and Comparative Examples 1 to 4 was charged with a constant current of 0.1 C rate at 45° C. until a voltage of about 4.3 V (vs. Li), and maintained at a constant voltage of 4.3 V (constant voltage mode) until a cutoff current of 0.05 C rate. Subsequently, the lithium batteries were discharged with a constant current of 0.1 C rate until the voltage reached 3.0 V (vs. Li) (formation cycle).

Each of the lithium batteries that underwent the formation cycle was charged with a constant current of 0.2 C rate at 45° C. until the voltage reached 4.3 V (vs. Li), and a constant voltage of 4.3 V (constant voltage mode) was maintained until a cutoff current of 0.05 C rate was reached. Subsequently, each of the lithium batteries was discharged with a constant current of 0.2 C rate until the voltage reached 3.0 V (vs. Li) ($1^{st}$ cycle).

Each of the lithium batteries that underwent the $1^{st}$ cycle was charged with a constant current of 1.0 C rate at 45° C. until the voltage reached 4.3 V (vs. Li), and a constant voltage of 4.3 V (constant voltage mode) was maintained until a cutoff current of 0.05 C rate was reached. Subsequently, each of the lithium batteries was discharged with a constant current of 1.0 C rate until the voltage reached 3.0 V (vs. Li) ($2^{nd}$ cycle). These cycles were repeated for 100 cycles under the same conditions until the $100^{th}$ cycle.

Some results of the charge/discharge test at high temperature are shown in Table 2. A capacity retention at the $100^{th}$ cycle may be defined by Equation 3. An initial efficiency in the formation process may be defined by Equation 2.

$$\text{Capacity retention(\%)}=(\text{discharge capacity at the } 100^{th} \text{ cycle/discharge capacity at the } 1^{st} \text{ cycle})\times 100\% \qquad \text{Equation 3}$$

$$\text{Initial efficiency(\%)}=(\text{discharge capacity at the formation cycle/charge capacity at the formation cycle})\times 100\% \qquad \text{Equation 2}$$

TABLE 2

|  | Capacity retention (%) | Initial efficiency (%) |
|---|---|---|
| Example 1 | 79.9 | 90.8 |
| Example 2 | 76.9 | 90.7 |
| Example 3 | 78.8 | 90.8 |
| Comparative Example 1 | 76.3 | 91.1 |
| Comparative Example 2: | 2.9 | 89.7 |
| Comparative Example 3 | 1.5 | 90.1 |
| Comparative Example 4 | Not measured | 90.4 |

As shown in Table 2, the lithium batteries of Examples 1 to 3 were found to have improved lifespan characteristics at high temperature, as compared with the lithium batteries of Comparative Examples 1 to 3.

The lithium batteries of Examples 1 to 3 were found to have significantly improved lifespan characteristics at high temperature, as compared with the lithium batteries of Comparative Examples 2 and 3 not including a carbonaceous conductive agent.

In addition, the lithium battery of Example 1 not including a conductive agent was found to have an improved initial efficiency, as compared with the lithium battery of Comparative Example 4 including a conductive agent.

Evaluation Example 6: Rate Capability Characteristics

Each of the lithium batteries manufactured in Examples 1 to 3 and Comparative Examples 1 to 3 was charged with a constant current of 0.1 C rate at 25° C. until a voltage of about 4.4 V (vs. Li), and maintained at a constant voltage of 4.4 V (constant voltage mode) until a cutoff current of 0.05 C rate. Subsequently, the lithium batteries were discharged with a constant current of 0.1 C rate until the voltage reached 3.0 V (vs. Li) (formation cycle).

Each of the lithium batteries that underwent the formation cycle was charged with a constant current of 0.2 C rate at 25° C. until the voltage reached 4.4 V (vs. Li), and a constant voltage of 4.4 V (constant voltage mode) was maintained until a cutoff current of 0.05 C rate was reached. Subsequently, each of the lithium batteries was discharged with a constant current of 0.2 C rate until the voltage reached 3.0 V (vs. Li) ($1^{st}$ cycle).

Each of the lithium batteries that underwent the $1^{st}$ cycle was charged with a constant current of 0.2 C rate at 25° C. until the voltage reached 4.4 V (vs. Li), and a constant voltage of 4.4 V (constant voltage mode) was maintained until a cutoff current of 0.05 C rate was reached. Subsequently, each of the lithium batteries was discharged with a constant current of 0.5 C rate until the voltage reached 3.0 V (vs. Li) (2nd cycle).

Each of the lithium batteries that underwent the $2^{nd}$ cycle was charged with a constant current of 0.2 C rate at 25° C. until the voltage reached 4.4 V (vs. Li), and a constant voltage of 4.4 V (constant voltage mode) was maintained until a cutoff current of 0.05 C rate was reached. Subsequently, each of the lithium batteries was discharged with a constant current of 0.1 C rate until the voltage reached 3.0 V (vs. Li) ($3^{rd}$ cycle).

Each of the lithium batteries that underwent the $3^{rd}$ cycle was charged with a constant current of 0.2 C rate at 25° C. until the voltage reached 4.4 V (vs. Li), and a constant voltage of 4.4 V (constant voltage mode) was maintained until a cutoff current of 0.05 C rate was reached. Subsequently, each of the lithium batteries was discharged with a constant current of 2.0 C rate until the voltage reached 3.0 V (vs. Li) ($4^{th}$ cycle).

Each of the lithium batteries that underwent the $4^{th}$ cycle was charged with a constant current of 0.2 C rate at 25° C. until the voltage reached 4.4 V (vs. Li), and a constant voltage of 4.4 V (constant voltage mode) was maintained until a cutoff current of 0.05 C rate was reached. Subsequently, each of the lithium batteries was discharged with a constant current of 3.0 C rate until the voltage reached 3.0 V (vs. Li) (5th cycle).

Each of the lithium batteries that underwent the $5^{th}$ cycle was charged with a constant current of 0.2 C rate at 25° C. until the voltage reached 4.4 V (vs. Li), and a constant voltage of 4.4 V (constant voltage mode) was maintained until a cutoff current of 0.05 C rate was reached. Subsequently, each of the lithium batteries was discharged with a constant current of 4.0 C rate until the voltage reached 3.0 V (vs. Li) ($6^{th}$ cycle).

During all these charge/discharge cycles, after one charge/discharge cycle, the evaluation was paused for 10 minutes.

Some results of the charge/discharge test at room temperature are shown in Table 3. The rate capability may be defined by Equation 4.

Rate capability(%)=(discharge capacity at the $n^{th}$ cycle/discharge capacity at the $1^{st}$ cycle)×100%    Equation 4

TABLE 3

|  | $3^{rd}$ cycle (1.0 C/0.2 C) (%) | $4^{th}$ cycle (2.0 C/0.2 C) (%) | $5^{th}$ cycle (3.0 C/0.2 C) (%) | $6^{th}$ cycle (4.0 C/0.2 C) (%) |
| --- | --- | --- | --- | --- |
| Example 1 | 94.8 | 92.8 | 91.4 | 90.5 |
| Example 2 | 94.1 | 92.3 | 90.9 | 90.0 |
| Example 3 | 94.6 | 92.5 | 91.2 | 90.2 |
| Comparative Example 1 | 94.6 | 92.6 | 91.3 | 90.3 |
| Comparative Example 2 | 86.1 | 69.3 | 51.0 | 35.1 |
| Comparative Example 3 | 94.0 | 92.0 | 90.7 | 89.9 |

As shown in Table 3, the lithium batteries of Examples 1 to 3 were found to have improved rate capability, as compared with the lithium batteries of Comparative Examples 1 to 3.

The lithium battery of Example 1 was found to have improved rate capability, as compared with the lithium battery of Comparative Example 1 including a conductive agent.

Evaluation Example 7: Measurement of Press Density

The press density of each of the composite positive active material alone or a mixture of the composite positive active material and a conductive agent used in the manufacture of the positive electrodes of Examples 1 to 3 and Comparative Examples 1 to 4 was measured. The results thereof are shown in Table 4.

3.0 g of each of the composite positive active material alone or a mixture of the composite positive active material and a conductive agent was dried at a temperature of 80° C., and a pressure of 2.6 ton was applied thereon for 30 seconds. Then, the press density was measured.

TABLE 4

|  | press density (g/cm$^3$) |
| --- | --- |
| Example 1 | 3.60 |
| Example 2 | 3.58 |
| Example 3 | 3.58 |
| Comparative Example 1 | 3.47 |
| Comparative Example 2 | 3.56 |
| Comparative Example 3 | 3.59 |
| Comparative Example 4 | 3.49 |

As shown in Table 4, the positive electrodes of Examples 1 to 3 not including a conductive agent were found to have significantly improved press density, as compared with the positive electrodes of Comparative Examples 1 and 4 including a conductive agent.

Accordingly, the lithium batteries of Examples 1 to 3 including the positive electrode not including a conductive agent were found to have improved energy density, as compared with lithium batteries of Comparative Examples 1 and 4 including the positive electrode including a conductive agent.

As apparent from the foregoing description, as a positive electrode may include a composite positive active material including a shell including a first metal oxide and a carbonaceous material, and a carbonaceous conductive agent may be present in the shell only in the positive electrode, a lithium battery may have improved lifespan characteristics at room temperature and high temperature and improved energy density.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and equivalents thereof.

What is claimed is:

1. A positive electrode comprising:
a positive electrode current collector and a positive active material layer on the positive electrode current collector,
wherein the positive active material layer comprises a composite positive active material and a binder,
the composite positive active material comprises: a core comprising a lithium transition metal oxide; and a shell on and conformed to a surface of the core,
the shell comprises: at least one first metal oxide represented by Formula $M_aO_b$, wherein 0<a≤3 and 0<b<4, provided that when a is 1, 2, or 3, b is not an integer; and a carbonaceous material matrix, the at least one first metal oxide is in the carbonaceous material matrix, and M is at least one metal selected from Groups 2 to 13 and 15 and 16 of the Periodic Table of Elements, and an amount of the first metal oxide is 0.3 wt % or greater based on a total amount of the composite positive active material, and wherein the shell further comprises a second metal oxide represented by Formula $M_aO_c$, wherein $0<a\leq 3$ and $0<c\leq 4$, provided that when a is 1, 2, or 3, c is an integer, the second metal oxide comprises a metal identical to the first metal oxide, and a ratio of a to c, c/a, in the second metal oxide is greater than a ratio of a to b, b/a, in the first metal oxide.

2. The positive electrode of claim 1, wherein the amount of the first metal oxide is in a range of about 0.3 wt % to about 1.8 wt % based on the total amount of the composite positive active material.

3. The positive electrode of claim 1, wherein voids are between adjacent particles of the composite positive active material.

4. The positive electrode of claim 1, wherein the first metal oxide comprises at least one metal selected from Al, Nb, Mg, Sc, Ti, Zr, V, W, Mn, Fe, Co, Pd, Cu, Ag, Zn, Sb, and Se.

5. The positive electrode of claim 1, wherein the first metal oxide is at least one selected from $Al_2O_z$, wherein $0<z<3$, $NbO_x$, wherein $0<x<2.5$, $MgO_x$, wherein $0<x<1$, $Sc_2O_z$, wherein $0<z<3$, $TiO_y$, wherein $0<y<2$, $ZrO_y$, wherein $0<y<2$, $V_2O_z$, wherein $0<z<3$, $WO_y$, wherein $0<y<2$, $MnO_y$, wherein $0<y<2$, $Fe_2O_z$, wherein $0<z<3$, $Co_3O_w$, wherein $0<w<4$, $PdO_x$, wherein $0<x<1$, $CuO_x$, wherein $0<x<1$, $AgO_x$, wherein $0<x<1$, $ZnO_x$, wherein $0<x<1$, $Sb_2O_z$, wherein $0<z<3$, and $SeO_y$, wherein $0<y<2$.

6. The positive electrode of claim 1, wherein the second metal oxide is selected from $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$.

7. The positive electrode of claim 1, wherein the first metal oxide is a reduction product of the second metal oxide.

8. The positive electrode of claim 1, wherein a thickness of the shell is in a range of about 1 nm to about 5 μm.

9. The positive electrode of claim 1, further comprising: a third metal coated on the core or a third metal oxide coated on the core,
wherein the shell is on the third metal or third metal oxide, and
the third metal oxide is an oxide of the third metal, and the third metal is selected from Al, Zr, W, and Co.

10. The positive electrode of claim 1, wherein an average diameter of at least one selected from the first metal oxide and the second metal oxide is in a range of about 1 nm to about 1 μm.

11. The positive electrode of claim 1, wherein the carbonaceous material matrix has a branched structure, the first metal oxide is distributed in the branched structure, and the branched structure comprises a plurality of carbonaceous material particles in contact with one another.

12. The positive electrode of claim 1, wherein the lithium transition metal oxide is represented by Formula 1:

$$Li_aNi_xCO_yM_zO_{2-b}A_b \quad \text{Formula 1}$$

wherein, in Formula 1,
$0.9\leq a\leq 1.2$, $0\leq b\leq 0.2$, $0.8\leq x\leq 0.95$, $0\leq y\leq 0.2$, $0<z\leq 0.2$, and $x+y+z=1$, M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and A is F, S, Cl, Br, or a combination thereof.

13. A lithium battery comprising the positive electrode according to claim 1.

14. A method of manufacturing a positive electrode, the method comprising:
providing a composite positive active material;
preparing a positive active material composition comprising the composite positive active material and a binder; and
preparing a positive electrode by providing the positive active material composition or a dry matter thereof on a positive electrode current collector,
wherein the composite positive active material comprises:
a core comprising a lithium transition metal oxide; and
a shell on and conformed to a surface of the core,
the shell comprises: at least one first metal oxide represented by Formula $M_aO_b$, wherein $0<a\leq 3$ and $0<b<4$, provided that when a is 1, 2, or 3, b is not an integer; and a carbonaceous material matrix,
the at least one first metal oxide is in the carbonaceous material matrix, and M is at least one metal selected from Groups 2 to 13 and 15 and 16 of the Periodic Table of Elements, and
an amount of the first metal oxide is 0.3 wt % or greater based on a total amount of the composite positive active material, and
wherein the shell further comprises a second metal oxide represented by Formula $M_aO_c$, wherein $0<a\leq 3$ and $0<c\leq 4$, provided that when a is 1, 2, or 3, c is an integer,
the second metal oxide comprises a metal identical to the first metal oxide, and
a ratio of a to c, c/a, in the second metal oxide is greater than a ratio of a to b, b/a, in the first metal oxide.

15. The method of claim 14, wherein the providing of the composite positive active material comprises:
providing a lithium transition metal oxide;
providing a first composite; and
mechanically milling the lithium transition metal oxide and the first composite.

16. The method of claim 15, wherein an average diameter of the first composite is in a range of about 1 μm to about 20 μm.

* * * * *